United States Patent
Dworatzek et al.

(10) Patent No.: US 8,097,154 B2
(45) Date of Patent: Jan. 17, 2012

(54) FILTER UNIT HAVING A CONICAL THREAD

(75) Inventors: Klemens Dworatzek, Edingen (DE); Ralf Bauder, Ketsch (DE); Steffen Ackermann, Speyer (DE)

(73) Assignee: Mann+Hummel GmbH, Ludwigsburg (DE)

( * ) Notice: Subject to any disclaimer, the term of this patent is extended or adjusted under 35 U.S.C. 154(b) by 98 days.

(21) Appl. No.: 12/376,012

(22) PCT Filed: Jul. 12, 2007

(86) PCT No.: PCT/EP2007/057170
§ 371 (c)(1),
(2), (4) Date: Oct. 23, 2009

(87) PCT Pub. No.: WO2008/015088
PCT Pub. Date: Feb. 7, 2008

(65) Prior Publication Data
US 2010/0181243 A1 Jul. 22, 2010

(30) Foreign Application Priority Data
Aug. 3, 2006 (DE) .................... 20 2006 011 990 U

(51) Int. Cl.
*B01D 27/08* (2006.01)

(52) U.S. Cl. .............. 210/232; 55/498; 55/504; 55/508; 285/333; 285/334; 285/383

(58) Field of Classification Search .................. 210/232; 55/498, 504, 508; 285/333, 334, 383
See application file for complete search history.

(56) References Cited

U.S. PATENT DOCUMENTS

| | | | | |
|---|---|---|---|---|
| 654,592 | A * | 7/1900 | Barr | 210/323.2 |
| 3,415,382 | A * | 12/1968 | Martin | 210/282 |
| 3,489,437 | A * | 1/1970 | Duret | 285/55 |
| 4,157,968 | A | 6/1979 | Kronsbein | |
| 4,537,429 | A * | 8/1985 | Landriault | 285/334 |
| 4,610,467 | A * | 9/1986 | Reimert | 285/24 |
| 5,164,082 | A * | 11/1992 | Lin | 210/238 |
| 5,961,678 | A | 10/1999 | Pruette | |
| 5,985,143 | A * | 11/1999 | Lin | 210/232 |
| 7,077,955 | B1 * | 7/2006 | Lin | 210/232 |

FOREIGN PATENT DOCUMENTS

| | | |
|---|---|---|
| DE | 2706017 A1 | 8/1978 |
| DE | 3805138 * | 8/1989 |
| DE | 102004029225 A1 * | 1/2006 |
| DE | 102004029225 A1 | 1/2006 |
| EP | 314963 A2 * | 5/1989 |
| WO | W02007/085427 | 8/2007 |
| WO | WO2007085247 A1 | 8/2007 |

* cited by examiner

*Primary Examiner* — Thomas M Lithgow

(57) ABSTRACT

To be able to insert a cylindrical filter element (10) which is joined at each end to an end disk (14) quickly into a housing element (40) in a filter unit (100) and connect it firmly, a screw connection having conical threads (16, 46) on the filter element (10) and on the bottom of the housing (41) is provided.

9 Claims, 5 Drawing Sheets

FILTER UNIT HAVING A CONICAL THREAD

TECHNICAL FIELD

The invention concerns a filter unit comprising a housing and a cylindrical filter element insertable therein and connected with its ends to a terminal disk, respectively.

PRIOR ART

Filter units are known that surround with their housing a substantially cylindrical filter element that, after removal of a lid, is accessible and can be exchanged. Plug and screw connections are known for attachment of the filter element on the bottom of the housing. Plug connections are not always sufficiently strong in order to force the filter element with its sealing surfaces axially against the housing bottom in order to effect an excellent sealing action between filter element and housing bottom. In case of screw connections several thread turns must be carried out in order to effect a screw connection that is satisfactorily fast; unscrewing the filter element for servicing purposes thus requires a corresponding great amount of time. Also, when unscrewing the lid special care must be taken that the thread turns of lid and housing are inserted precisely into one another because otherwise the filter housing can be damaged.

Moreover, bayonet closures are known that, however, have the disadvantage that they are able to generate only locally high pressing forces while the areas located between the locking elements, especially in case of deformable plastic elements, can give way. An annular seal between lid and housing especially in the case of large diameters of the air filter unit may not be satisfactorily pressed in place by means of a bayonet closure. Since the advancement in the axial direction in case of a bayonet locking action cannot be influenced, the required pretension of the seal cannot be adjusted by the operator so that leaks may occur as a result of tolerances in the seal geometry.

It is thus an object of the invention to provide for a filter unit of the aforementioned kind a connection of filter element and housing that is fast in operation and can be released quickly in case of a servicing situation.

SUMMARY OF THE INVENTION

This object is solved by a filter unit having the features of claim 1.

As a result of the conical configuration of the thread projection and the thread bore a self-centering action is provided when the filter element is pushed onto the housing element. A rotation by a relatively small angle is then sufficient for engaging several thread turns with one another and to therefore effect a correspondingly high strength of the thread connection relative to axial forces.

A buttress thread has been found to be advantageous in this connection; it is well suited as a clearance thread. Of course, other thread shapes can also be used.

For example, a conical buttress thread is suitable that, for a diameter of approximately 100 mm has 4 to 5 thread turns that are arranged at a cone angle of 6 degrees to 12 degrees.

Further advantageous embodiments of the invention can be taken from the further dependent claims and will be explained in the following with reference to the illustrated embodiments.

BRIEF DESCRIPTION OF THE DRAWINGS

The invention will be explained in the following with reference to the drawings in more detail. The figures show the following, respectively.

EMBODIMENT(S) OF THE INVENTION

Figure 1:
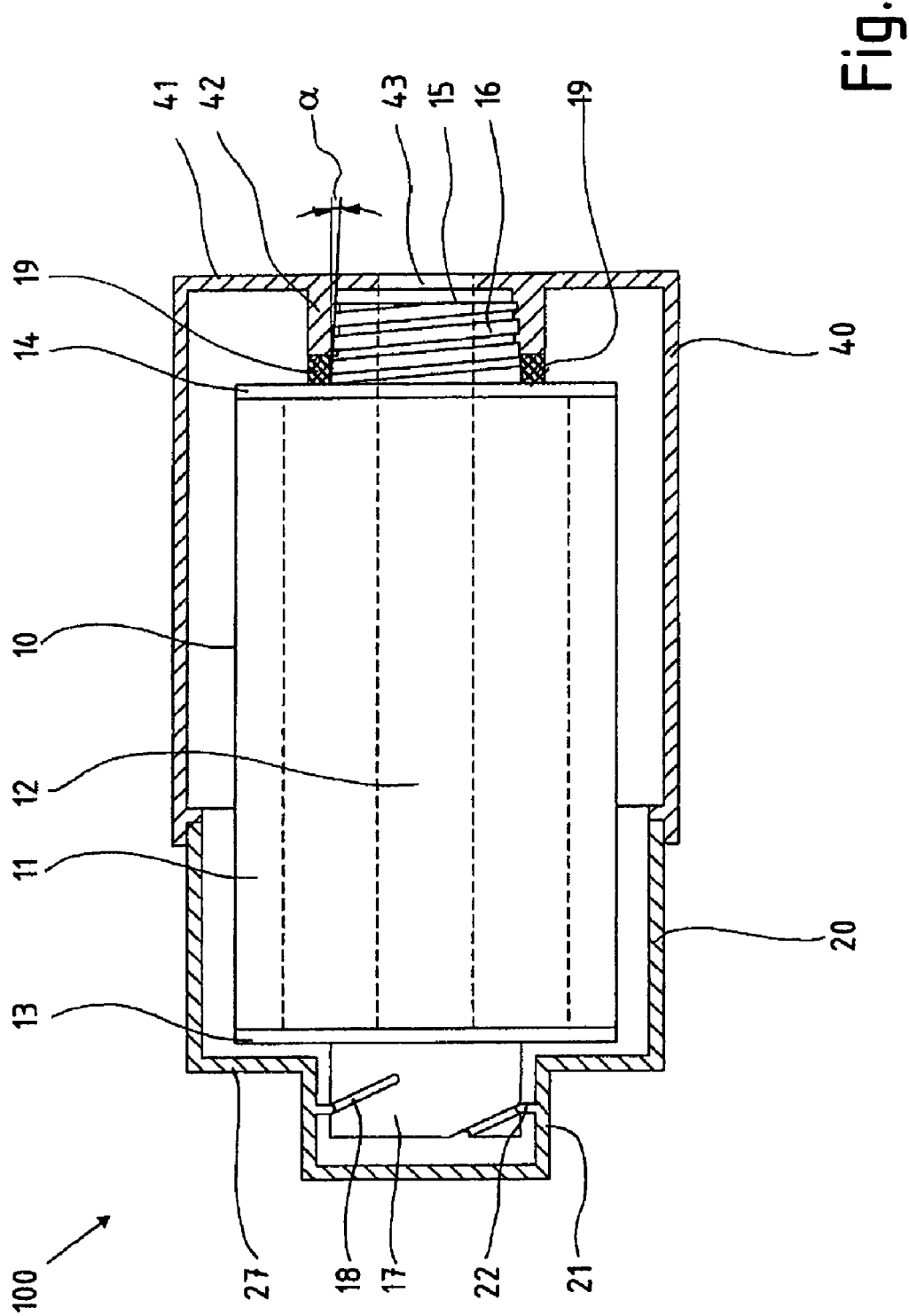
FIG. 1 a schematic section view of a first embodiment of a filter unit.

In FIG. 1, the filter unit 100 according to the invention is illustrated in a schematic section illustration. In the interior of a housing which is comprised of a housing cup 40 and a lid element 20, a filter element 10 is arranged. The filter element 10 comprises a filter bellows 11 that is formed, for example, of pleated filter paper that is coiled to a cylindrical tubular body. The filter bellows 11 is connected with its ends to terminal disks 13, 14 and together with them forms a cylindrical hollow body. Air enters the housing through an inlet socket (not illustrated) of the housing from the exterior circumference, flows through the filter bellows 11 of the filter element 10 and its central flow passage 12 and exits through an outlet opening 43 that is arranged centrally on a housing bottom 41.

In this connection, in particular the sealing action of the annularly configured terminal disk 14 relative to the housing cup or the housing bottom 41 is important because otherwise dirt-laden medium can flow past the filter element 10 directly to the outlet opening 43. For this purpose, the terminal disk 14 has a projection 15 with a thread 16. The projection 15 is conical and has a cone angle α of 8 degrees to 12 degrees relative to the center axis.

Arranged oppositely there is a projection 42 on the housing bottom 41 that is provided with a conical inner thread 46 that can be engaged by the outer thread 16 of the projection 15. By means of the threads, the filter element 10 and the housing part 40 can be fixedly connected to one another.

An annular seal 19 seals the gap between the terminal disk 14 of the filter element 14 and the housing bottom 41.

At the other terminal disk 13 of the filter element 10 a projection 17 is integrally formed and, in the illustrated embodiment, is provided with a groove 18. On the lid element 20 of the housing a raised part 21 is integrally formed on the end face 27 and pins 22 project radially inwardly away from it and can engage the grooves 18 so that a bayonet connection between lid element 20 and filter element 10 is generated.

Figure 2:
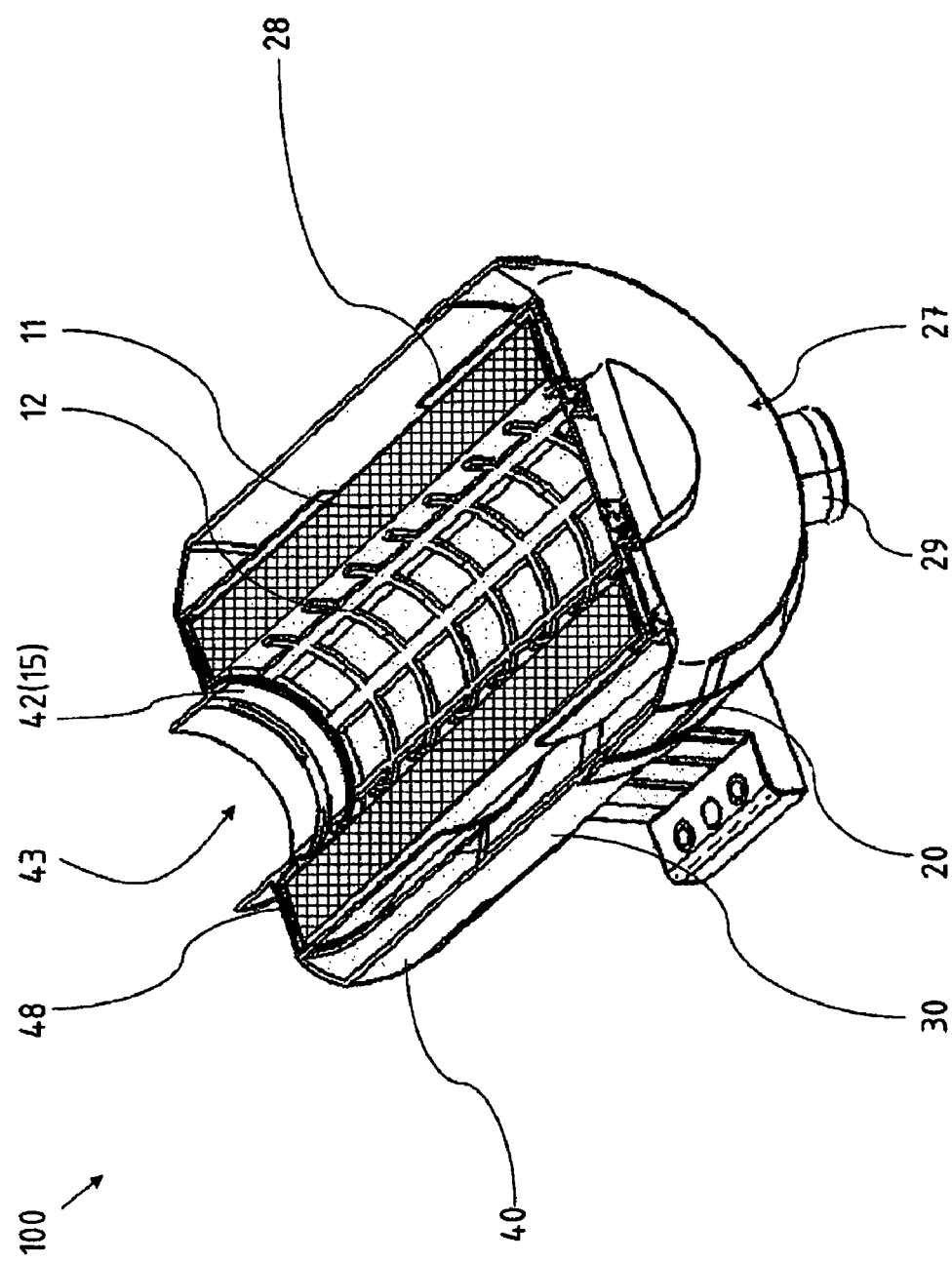
FIG. 2 a section view of a filter unit in a perspective view.

The filter unit that is only schematically illustrated in FIG. 1 is also shown in FIG. 2 in section in the form of a concrete embodiment. Clearly shown is an inner tube positioned inwardly on the filter element 10 and also shown in section which inner tube has no closed outer wall but a grid structure in order to impair as little as possible a radial air flow through the filter bellows 11 into the central flow passage 12.

In the area of the lid 20 the filter element 10 is surrounded by an additional collar 28 so that between the outer side of the collar 28 and the housing wall of the housing part 20 an annular gap is formed. The same holds true for the opposite end where a collar 48 surrounds the filter element 10. For tangential flow of the unfiltered air at the inlet socket the air mass that is introduced into the housing flows across the inner circumference of the housing wall so that heavy dust particles are separated and can flow out of the separator socket 29 while the air flows radially from the exterior to the interior through the filter bellows 11.

Figure 3A:
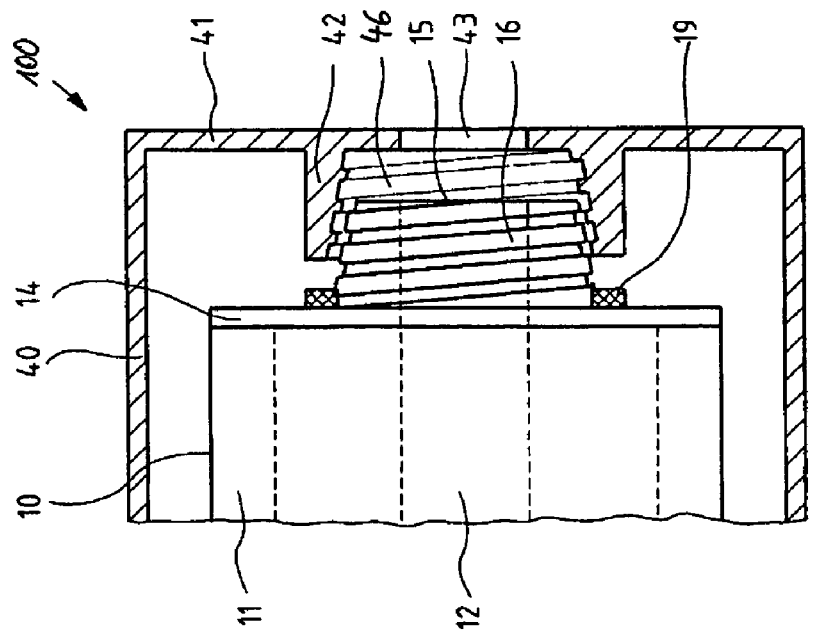
FIGS. 3a, 3b a detail of the first embodiment in different mounting stages, each one shown in section.

FIG. 3a shows in detail the connection between the filter element 10 and the housing cup 40 of the filter unit 100. On the terminal disk 14 of the filter element 10 the projection 15 is integrally formed and projects in the direction toward the housing bottom 41 and is provided with an outer thread 16. As indicated by the dashed lines, the projection 15 surrounds a central flow passage 12 in the filter element 10 that opens toward the outlet opening 43 in the housing bottom 41. On the housing bottom 41 the projection 42 is integrally formed whose conical inner thread 46 is compatible to the outer thread 16 of the projection 15 on the terminal disk 14.

In the situation illustrated in FIG. 3a the filter element 10 with its projection 15 is already located within the threaded bore of the projection 42 but, as a result of the conical configuration, the thread turns are not yet in engagement in this axial position of the filter element 10 relative the housing bottom 41. For illustration purposes, in FIG. 3a the gap width between the outer thread 16 and the inner thread 46 is somewhat exaggerated.

When the filter element 10 is farther advanced the stays of the thread 15 are positioned directly in front of the grooves of the thread 46 and vice versa. A rotation by 1 or 1½ turns is then sufficient in order to engage the thread turns completely and to screw the filter element 10 fixedly into the projection 42 of the housing bottom 41.

Figure 3B:
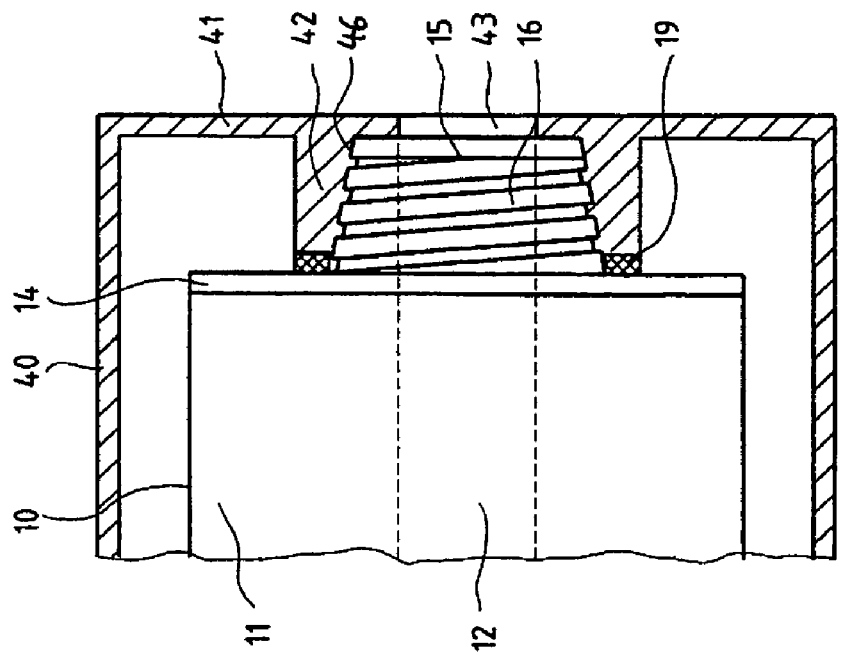

The final situation is illustrated in FIG. 3b where the threads 16, 46 engage one another and the filter element 10 has been moved so far axially toward the housing bottom 41 that an annular seal 19 is fixedly pressed on. This prevents that air can flow from the flow path at the outer circumference of the housing element 40 past the filter element 10 through the outlet opening 43.

Figure 4:
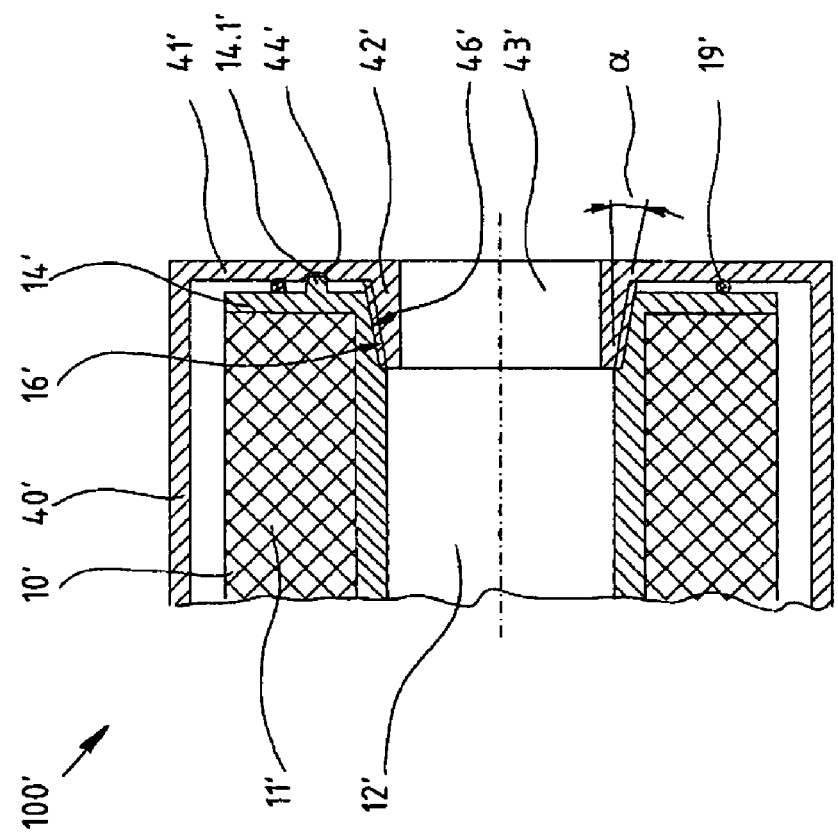
FIG. 4 a detail of a second embodiment in section.

FIG. 4 shows a kinematically reversed embodiment of a filter unit 100' where on the housing bottom 41' a projection 42' with outer thread is provided and on the filter element 10' a thread bore 16' is provided. In this embodiment the connection is also generated by means of two conical threads 16', 46' having a cone angle α. Again, in the mounted state an annular ring 19' is pressed between terminal disk 14' and housing bottom 41'.

In the embodiment according to FIG. 4 it is moreover provided that a locking pin 14.1' projects away from the terminal disk 14'. When the filter element 10' is screw-connected by means of the threads 16', 46', the locking projection 14.1' engages in the provided end position a corresponding recess 44' in the housing bottom so that an anti-rotation device is provided. By providing several recesses, different locking positions can be preset.

The invention claimed is:

1. Filter unit (100) comprising:
   a filter housing including
      a housing bottom wall having an axial flow opening extending through said bottom wall, said housing bottom wall having an axially extending thread annularly surrounding said flow opening;
   a cylindrical filter element enclosed within said filter housing, said filter element including
      a cylindrical filter bellows surrounding a central flow passage therein, said filter bellows having axially opposing ends;
      a terminal disk fixedly connected to one of said opposing ends of said filter bellows, a portion of said terminal disk forming
         an axially outwardly extending threaded annular projection having a counter thread;
      wherein the thread of said housing bottom and the counter thread of said terminal disk each are conical and are engaged with one another, said threaded engagement forming a correspondingly high strength threaded connection relative to axial forces of said filter element to said housing bottom wall.

2. Filter unit comprising:
   a filter housing including
      a housing bottom wall having a threaded annular projection on an inner surface of said housing bottom wall, said threaded annular projection extending axially inwardly into an interior of said filter housing;
      a flow opening extending through said bottom wall threaded projection;
   a cylindrical filter element enclosed within said filter housing, said filter element including
      a cylindrical filter bellows surrounding a central flow passage, said filter bellows having axially opposing ends;
      a terminal disk fixedly connected to one of said opposing ends of said filter bellows, said terminal disk including
         an axially outwardly extending threaded annular projection having a counter thread;
   wherein said threaded projection of said housing bottom wall threadably engages said filter element terminal disk threaded annular projection, said threaded engagement forming a correspondingly high strength threaded connection relative to axial forces of said filter element to said housing bottom wall;
   wherein
      the thread of the threaded annular projection of said housing bottom wall is a radially inner thread and
      the counter thread of said terminal disk is a radially outer thread.

3. Filter unit comprising:
   a filter housing including
      a housing bottom wall shaped to have a threaded annular projection on an inner surface of said housing bottom wall, said threaded annular projection extending axially inwardly into an interior of said filter housing, said threaded annular projection being a radially outer thread on an outer surface of said threaded annular projection;
      a flow opening extending through said threaded projection of said bottom wall from an interior of said filter housing to an exterior of said filter housing;
   a cylindrical filter element enclosed within said filter housing, said filter element including
      a cylindrical filter bellows surrounding a central flow passage;
      a terminal disk fixedly connected to a axial end of said filter bellows, said terminal disk having a threaded bore extending through said terminal disk into said central flow passage;
   wherein said thread of said threaded bore of said terminal disk is an inner thread,
   wherein the inner thread and the outer thread each are conical and are threadably engaged with one another, said threaded engagement forming a correspondingly high strength threaded connection relative to axial forces of said filter element to said housing bottom wall,
   wherein said central flow passage is connected to said flow opening of said annular projection.

4. The filter unit according to claim 3 wherein
   the threads on said terminal disk and said filter housing bottom wall surround a portion of said flow passage extending along the center axis of the filter element and of the housing and/or surround said housing flow opening,
   wherein said conical threads on said terminal disk and said filter housing bottom wall are buttress threads.

5. The filter unit according to claim 2 wherein
the threads on said terminal disk and said filter housing bottom wall surround a portion of said flow passage extending along the center axis of the filter element and of the housing and/or surround said housing flow opening, wherein said threads on said terminal disk and said filter housing bottom wall are conical buttress threads.

6. The filter unit according to claim 4 or 5 wherein
the conical threads have a cone angle of 6 degrees to 12 degrees.

7. The filter unit according to claim 4 or 5 wherein
4 to 5 thread turns of both conical threads engage one another for the filter element screwed onto the housing bottom.

8. The filter unit according to claim 1, 2 or 3 wherein
in the mounted state of the filter element between the terminal disk of the filter element and the housing bottom in at least one angular position a locking connection is generated;

wherein said terminal disk includes
at least one semi-spherical locking projection projecting outwardly away from said filter element;

wherein said filter housing bottom wall includes
at least one recess formed into an inner surface of said housing bottom wall;

wherein said at least one semi-spherical locking projection lockably engages into said at least one recess upon rotation of said filter element in aid filter housing, wherein said locking engagement providing at least one preset locking position of said filter element in said filter housing, wherein said locking engagement of said at least one semi-spherical locking projection into said at least one recess forms an anti-rotation device, locking said filter element into said one of said at least one preset locking position within said filter housing, wherein, when in said mounted state, said locking engagement of said filter housing to said terminal disk forms said locking connection.

9. The filter unit according to claim 3, wherein
said bottom housing wall threaded annular projection extends into an interior region of said filter bellows, and wherein said inner thread of said filter element is interior to said filter element within said central flow passage.

\* \* \* \* \*